United States Patent
Lee et al.

(10) Patent No.: US 12,033,562 B2
(45) Date of Patent: Jul. 9, 2024

(54) CONTROL METHOD FOR DATA DRIVER AND TIMING CONTROLLER, AND ELECTRONIC DEVICE

(71) Applicants: Beijing ESWIN Computing Technology Co., Ltd., Beijing (CN); Hefei ESWIN Computing Technology Co., Ltd., Hefei (CN)

(72) Inventors: Dongmyung Lee, Beijing (CN); Donghoon Baek, Beijing (CN); Jangjin Nam, Beijing (CN); Enwei Ni, Beijing (CN)

(73) Assignees: Beijing ESWIN Computing Technology Co., Ltd., Beijing (CN); Hefel ESWIN Computing Technology Co., Ltd., Hefei (CN)

( * ) Notice: Subject to any disclaimer, the term of this patent is extended or adjusted under 35 U.S.C. 154(b) by 0 days.

(21) Appl. No.: 18/170,759

(22) Filed: Feb. 17, 2023

(65) Prior Publication Data
US 2023/0290297 A1    Sep. 14, 2023

(30) Foreign Application Priority Data
Mar. 8, 2022    (CN) .......................... 202210232437.2

(51) Int. Cl.
*G09G 3/20*    (2006.01)
*G09G 5/393*    (2006.01)

(52) U.S. Cl.
CPC ........... *G09G 3/2096* (2013.01); *G09G 5/393* (2013.01); *G09G 2310/0275* (2013.01); *G09G 2320/0252* (2013.01); *G09G 2330/021* (2013.01); *G09G 2330/06* (2013.01); *G09G 2370/08* (2013.01); *G09G 2370/10* (2013.01); *G09G 2370/16* (2013.01)

(58) Field of Classification Search
CPC .................................................... G09G 3/2096
See application file for complete search history.

(56) References Cited

U.S. PATENT DOCUMENTS

2016/0140892 A1    5/2016    Park et al.

*Primary Examiner* — Gustavo Polo
(74) *Attorney, Agent, or Firm* — Leason Ellis LLP

(57) ABSTRACT

A control method for a data driver, a control method for a timing controller, a data driver control apparatus, a timing controller, an electronic device, and a storage medium are provided. The control method for the data driver includes: obtaining a data comparison signal, where the data comparison signal represents a comparison relationship between first display data for enabling a first pixel row to display and second display data for enabling a second pixel row to display, and in time, the second pixel row is driven to display after the first pixel row is driven to display; and controlling an operation state of the data driver according to the data comparison signal.

16 Claims, 7 Drawing Sheets

CONTROL METHOD FOR DATA DRIVER AND TIMING CONTROLLER, AND ELECTRONIC DEVICE

This application claims priority of the Chinese Patent Application No. 202210232437.2, filed on Mar. 8, 2022. For all purposes under the U.S. law, the entire disclosure of the aforementioned application is incorporated by reference as part of the disclosure of this application.

TECHNICAL FIELD

Embodiments of the present disclosure relate to a control method for a data driver, a control method for a timing controller, a data driver control apparatus, a timing controller, an electronic device, and a storage medium.

BACKGROUND

At present, with continuous development and progress of display technology, the market gradually raises performance requirements for display products. For example, in order to achieve better display effects, it is usually necessary to improve display performance parameters of the display product, such as the resolution, frame rate, or the like, so that the transmission speed of data used for display in the display product can be accelerated accordingly.

SUMMARY

At least one embodiment of the present disclosure provides a control method for a data driver of a display panel, and the control method comprises: obtaining a data comparison signal, wherein the data comparison signal represents a comparison relationship between first display data for enabling a first pixel row to display and second display data for enabling a second pixel row to display, and in time, the second pixel row is driven to display after the first pixel row is driven to display; and controlling an operation state of the data driver according to the data comparison signal.

For example, in the control method for the data driver provided by an embodiment of the present disclosure, the data driver comprises a plurality of modules, and the plurality of modules are configured to receive an input data signal and obtain display data from the input data signal; and controlling the operation state of the data driver according to the data comparison signal, comprises: obtaining the second display data based on the first display data which has been cached by the data driver in response to the data comparison signal representing that the first display data and the second display data have a first comparison relationship, wherein the first comparison relationship comprises the first display data being identical or reverse to the second display data; or obtaining the second display data based on an input data signal which is received by the data driver and used for the second pixel row in response to the data comparison signal representing that the first display data and the second display data have a second comparison relationship different from the first comparison relationship.

For example, in the control method for the data driver provided by an embodiment of the present disclosure, controlling the operation state of the data driver according to the data comparison signal, further comprises: determining whether the data driver receives the input data signal in response to the first comparison relationship.

For example, in the control method for the data driver provided by an embodiment of the present disclosure, obtaining the second display data based on the input data signal which is received by the data driver and used for the second pixel row, comprises: performing physical layer processing on an input electrical signal received by the data driver, and extracting the input data signal from the input electrical signal; and performing link layer processing on the input data signal to obtain the second display data based on the input data signal.

For example, in the control method for the data driver provided by an embodiment of the present disclosure, controlling the operation state of the data driver according to the data comparison signal, further comprises: allowing at least one of the plurality of modules to be in a first operation state in response to the first comparison relationship; and allowing each of the plurality of modules to be in a second operation state in response to the second comparison relationship, wherein power consumption of each of the plurality of modules in the first operation state is less than power consumption of the each of the plurality of modules in the second operation state.

For example, in the control method for the data driver provided by an embodiment of the present disclosure, allowing at least one of the plurality of modules to be in the first operation state, comprises: allowing the at least one module to be in an inactive state.

For example, in the control method for the data driver provided by an embodiment of the present disclosure, the plurality of modules comprise a physical layer processing module, and the physical layer processing module comprises a data path sub-module and a clock path sub-module; and allowing the at least one module to be in the inactive state comprises: allowing the data path sub-module to be in an inactive state.

For example, in the control method for the data driver provided by an embodiment of the present disclosure, the plurality of modules comprise a physical layer processing module, and the physical layer processing module comprises a clock data recovery sub-module; and allowing the at least one module to be in the inactive state comprises: allowing a data recovery processing operation portion of the clock data recovery sub-module to be in an inactive state.

For example, in the control method for the data driver provided by an embodiment of the present disclosure, the plurality of modules comprise a link layer processing module, and the link layer processing module comprises a display data formatting sub-module; and allowing the at least one module to be in the inactive state comprises: allowing the display data formatting sub-module to be in an inactive state.

For example, in the control method for the data driver provided by an embodiment of the present disclosure, the plurality of modules comprise a physical layer processing module, and the physical layer processing module comprises an analog front-end sub-module; and allowing the at least one module to be in the inactive state comprises: allowing the analog front-end sub-module to be in an inactive state or to receive an electrical signal of a constant level.

For example, in the control method for the data driver provided by an embodiment of the present disclosure, the plurality of modules comprise a channel array processing module, the channel array processing module comprises a first latching sub-module and a second latching sub-module which are cascaded, and the first latching sub-module and the second latching sub-module are configured to cache the display data to be provided to the display panel; and allowing the at least one module to be in the inactive state comprises: allowing the first latching sub-module and/or the second latching sub-module to be in an inactive state.

For example, in the control method for the data driver provided by an embodiment of the present disclosure, obtaining the second display data based on the first display data which has been cached by the data driver, comprises: outputting the first display data which has been cached by the data driver as the second display data in response to the first comparison relationship representing the first display data being identical to the second display data; or reversing, in the data driver, the first display data which has been cached by the data driver to obtain the second display data in response to the first comparison relationship representing the first display data being reverse to the second display data.

For example, in the control method for the data driver provided by an embodiment of the present disclosure, the first pixel row and the second pixel row are driven in an adjacent sequence in time for display, and the first pixel row and the second pixel row are two adjacent pixel rows arranged in the display panel.

At least one embodiment of the present disclosure further provides a control method for a timing controller, and the control method comprises: determining, according to source input data received from a data source, a comparison relationship between first display data for enabling a first pixel row to display and second display data for enabling a second pixel row to display, and generating a data comparison signal for representing the comparison relationship, wherein in time, the second pixel row is driven to display after the first pixel row is driven to display; and transmitting the data comparison signal to a data driver.

For example, the control method for the timing controller provided by an embodiment of the present disclosure further comprises: disallowing to transmit an input data signal corresponding to the second display data to the data driver in response to the data comparison signal representing that the first display data and the second display data have a first comparison relationship, wherein the first comparison relationship comprises the first display data being identical or reverse to the second display data.

For example, in the control method for the timing controller provided by an embodiment of the present disclosure, disallowing to transmit the input data signal corresponding to the second display data to the data driver, comprises: transmitting a virtual electrical signal to the data driver or stopping transmitting a valid electrical signal to the data driver during a time period of transmitting the input data signal corresponding to the second display data.

At least one embodiment of the present disclosure further provides a timing controller, and the timing controller comprises a data comparison signal generating unit and a signal transmitting unit; the data comparison signal generating unit is configured to determine, according to source input data received from a data source, a comparison relationship between first display data for enabling a first pixel row to display and second display data for enabling a second pixel row to display and generate a data comparison signal for representing the comparison relationship, wherein in time, the second pixel row is driven to display after the first pixel row is driven to display; and the signal transmitting unit is configured to transmit the data comparison signal to a data driver.

At least one embodiment of the present disclosure further provides an electronic device, and the electronic device comprises the timing controller and the data driver according to any one of the embodiments of the present disclosure;

the data driver comprises a data comparison signal acquiring unit and an operation state controlling unit; the data comparison signal acquiring unit is configured to obtain the data comparison signal; and the operation state controlling unit is configured to control an operation state of the data driver according to the data comparison signal.

For example, the electronic device provided by an embodiment of the present disclosure further comprises a display panel, and the data driver is configured to provide display data to the display panel for driving pixel rows in the display panel to display.

At least one embodiment of the present disclosure further provides an electronic device, and the electronic device comprises a memory and a processor; the memory is configured to store computer-executable instructions in a non-transitory manner; the processor is configured to execute the computer-executable instructions; and the computer-executable instructions, upon execution by the processor, cause the processor to implement the control method for the data driver according to any one of the embodiments of the present disclosure.

BRIEF DESCRIPTION OF THE DRAWINGS

In order to clearly illustrate the technical solutions of the embodiments of the present disclosure, the drawings of the embodiments will be briefly described in the following. It is obvious that the described drawings are only related to some embodiments of the present disclosure and thus are not limitative to the present disclosure.

DETAILED DESCRIPTION

Figure 1:
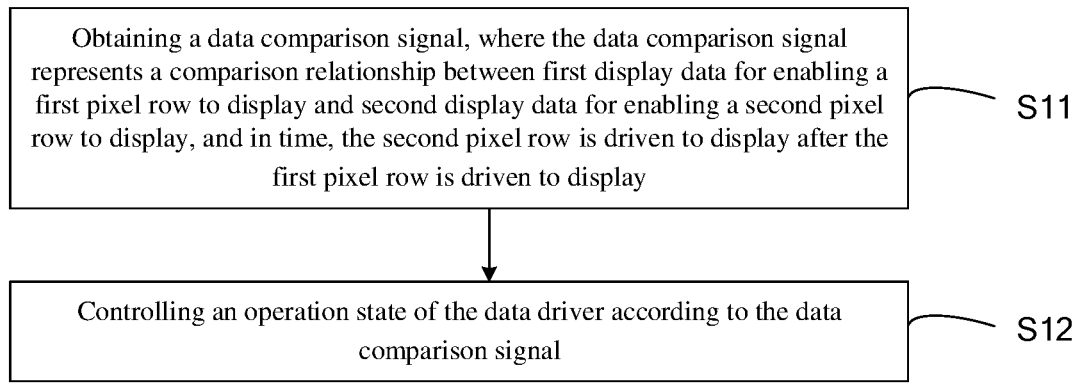
FIG. 1 is a schematic flowchart of a control method for a data driver provided by some embodiments of the present disclosure.

In order to make objects, technical solutions, and advantages of the embodiments of the present disclosure apparent, the technical solutions of the embodiments of the present disclosure will be described in a clearly and fully understandable way in connection with the drawings related to the embodiments of the present disclosure. Apparently, the described embodiments are just a part but not all of the embodiments of the present disclosure. Based on the described embodiments of the present disclosure herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect," "connected," "coupled," etc., are not intended to define a physical connection or mechanical connection, but may include an electrical connection, directly or indirectly. "On," "under," "right," "left," and the like are only used to indicate relative position relationship, and when the position of the object which is described is changed, the relative position relationship may be changed accordingly.

With continuous increase of display performance parameters of the display product, such as the resolution, frame rate, or the like, the transmission speed of data used for display in the display product is accelerated accordingly, thereby constantly increasing power consumption of transmission interfaces, logic circuits, or other units or modules used for data transmission and data processing in the display product, which further leads to great increase in total power consumption of the display product, and sharply increases use costs of the product.

Moreover, because the total power consumption of the display product has greatly increased, when the display product is used, for example, for low voltage domain display, a higher operation current may also cause serious adverse effects on characteristics of the display product, such as the ability to resist high-frequency electromagnetic interference (EMI), wireless wide area network (WWAN) signal transmission, or the like, which reduces stability and reliability of signal transmission in the display product.

At least one embodiment of the present disclosure provides a control method for a data driver of a display panel, and the control method includes: obtaining a data comparison signal, where the data comparison signal represents a comparison relationship between first display data for enabling a first pixel row to display and second display data for enabling a second pixel row to display, and in time, the second pixel row is driven to display after the first pixel row is driven to display; and controlling an operation state of the data driver according to the data comparison signal.

In the control method for the data driver provided by the above-described embodiments of the present disclosure, by obtaining the comparison relationship between the second display data corresponding to the second pixel row to be driven to display and the first display data corresponding to the first pixel row to be driven to display previous to the second pixel row, the data driver may be controlled to be in different operation states according to the comparison relationship, so that the operation power consumption of the data driver may be flexibly controlled, so as to facilitate achieving advantageous effects of reducing the operation power consumption of the data driver and further reducing the total system power consumption, thereby reducing use costs of the product.

Hereinafter, the embodiments of the present disclosure will be described in detail with reference to the accompanying drawings. It should be noted that the same reference numerals in different drawings will be used to refer to the same elements described.

FIG. 1 is a schematic flowchart of a control method for a data driver provided by some embodiments of the present disclosure.

As illustrated in FIG. 1, the control method for the data driver of a display panel provided by the embodiments of the present disclosure includes steps S11 and S12.

Step S11: obtaining a data comparison signal, where the data comparison signal represents a comparison relationship between first display data for enabling a first pixel row to display and second display data for enabling a second pixel row to display, and in time, the second pixel row is driven to display after the first pixel row is driven to display.

Step S12: controlling an operation state of the data driver according to the data comparison signal.

For example, the display panel in the above-described embodiments of the present disclosure may be a liquid crystal panel, a liquid crystal television, an OLED panel, an OLED television, a QLED panel, a QLED television, a display, an electronic paper display apparatus, a mobile phone, a tablet computer, a laptop computer, a digital photo frame, a navigator, and any other product or component having a display function; and types of the display panel will not be specifically limited in the embodiments of the present disclosure.

For example, with respect to the above-described Step S11, the display data is used for driving a corresponding pixel row to perform a display operation. For example, after signal processing such as noise reduction, digital-analog conversion, operational amplification, or the like is performed on the display data, a display voltage or a display current obtained based on the display data may be applied to the corresponding pixel row, so that sub-pixels in the corresponding pixel row may display according to the applied display voltage or display current.

For example, the chronological order of which the second pixel row is driven to display is subsequent to the first pixel row; and before the data driver obtains the second display data corresponding to the second pixel row, the first display data corresponding to the first pixel row has been obtained and cached in the data driver. For example, the second pixel row is a pixel row to be driven to display, and the first pixel row may be a pixel row, of which the chronological order of being driven to display is previous to the second pixel row, that has not been driven to display as well, or the first pixel row may also be a pixel row that has been driven to display, which will not be specifically limited in the embodiments of the present disclosure.

For example, the comparison relationship between the first display data and the second display data may include the first display data being identical to the second display data, the first display data being reverse to the second display data, or other relative data relationships between the first display data and the second display data.

For example, the first display data and the second display data may be digital signals represented on the principle of binary system; and the first display data being reverse to the second display data may be interpreted as the first display data and the second display data being reverse to each other bit by bit, that is, the second display data may be obtained after performing a logic inverting operation on the first display data, or the first display data may be obtained after performing a logic inverting operation on the second display data.

For example, taking that the first display data and the second display data are respectively "0100" and "1011" as encoded in the binary system as an example, "0100" and "1011" are reverse to each other bit by bit, that is, 0100=!{1011}, and therefore one of the first display data and the second display data may be logically inverted to obtain the other.

For another example, the first display data and the second display data may also be analog signals represented by continuously changing physical quantities; and the first display data being reverse to the second display data may be interpreted as phases of the first display data and the second display data being reverse to each other, that is, the second display data may be obtained after a phase of the first display data is inverted or reversed, or the first display data may be obtained after a phase of the second display data is inverted or reversed.

It should be noted that data types of the first display data and the second display data will not be specifically limited in the embodiments of the present disclosure. According to actual application requirements, the first display data and the second display data may be digital signals or analog signals as described above, or may also be other suitable types of electrical signals, etc.

For example, with respect to the above-described Step S12, after the data comparison signal representing the comparison relationship between the first display data and the second display data is acquired, the data driver may be controlled to operate in corresponding different operation states according to the data comparison signal. For example, according to the comparison relationship between the first display data and the second display data, different operation modes or different operation flows of the data driver for acquiring the second display data may be determined, so that the data driver may operate in different operation states accordingly.

Therefore, by obtaining the comparison relationship between the second display data corresponding to the second pixel row to be driven to display and the first display data corresponding to the first pixel row to be driven to display previous to the second pixel row, the data driver may be controlled to be in different operation states according to the comparison relationship, so that the operation power consumption of the data driver can be flexibly controlled, so as to facilitate achieving advantageous effects of reducing the operation power consumption of the data driver and further reducing the total system power consumption, thereby reducing use costs.

For example, according to different comparison relationships between the first display data and the second display data, it may be determined whether the data driver may be allowed to obtain the second display data according to the first display data which has been cached in the data driver, thereby facilitating reducing the power consumption of the data driver in the process of acquiring the second display data and reducing the total system power consumption of the data driver.

In addition, the control method for the data driver provided by the above-described embodiments of the present disclosure may also reduce an operation current generated in the data driver by reducing the total system power consumption of the data driver when the display panel adopting the data driver is used such as for low voltage domain display, which is favorable for improving characteristics of signal transmission in the data driver, for example, the ability to resist high-frequency electromagnetic interference (EMI), wireless wide area network (WWAN) signal transmission performance, or the like, thereby improving stability and reliability of signal transmission in the data driver.

Figure 2:
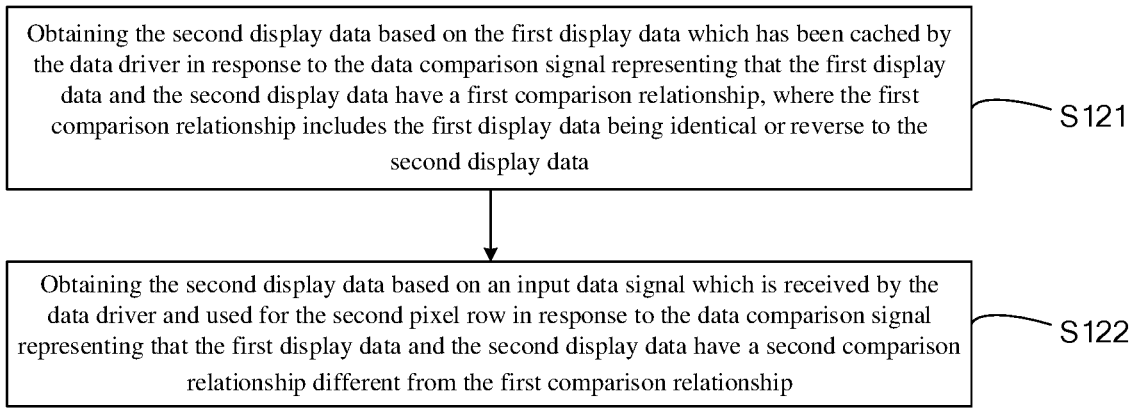
FIG. 2 is a schematic flowchart of Step S12 in the control method for the data driver provided by some embodiments of the present disclosure.

FIG. 2 is a schematic flowchart of Step S12 in the control method for the data driver provided by some embodiments of the present disclosure.

As illustrated in FIG. 2, in some embodiments of the present disclosure, the above-described Step S12 includes Step S121 and Step S122.

Step S121: obtaining the second display data based on the first display data which has been cached by the data driver in response to the data comparison signal representing that the first display data and the second display data have a first comparison relationship, where the first comparison relationship includes the first display data being identical or reverse to the second display data.

Step S122: obtaining the second display data based on an input data signal which is received by the data driver and used for the second pixel row in response to the data comparison signal representing that the first display data and the second display data have a second comparison relationship different from the first comparison relationship.

For example, with respect to the above-described steps S121 and S122, by determining the comparison relationship between the first display data and the second display data, the data driver may be controlled to acquire the second display data in different ways. Therefore, the data driver may be allowed to operate in different operation states, which is favorable for flexible control of the operation power consumption of the data driver, thereby facilitating reducing use costs of the data driver.

For example, in the case where it is determined in Step S121 that the first display data is identical or reverse to the second display data, the data driver may be enabled to obtain the second display data according to the first display data which has been cached in the data driver, so as to facilitate reducing the power consumption required by the data driver in the process of acquiring the second display data, and reducing the total system power consumption of the data driver.

For example, in the case where it is determined in Step S122 that there is no identical or reverse comparison relationship between the first display data and the second display data, an appropriate signal processing operation is performed on the input data signal, corresponding to the second pixel row, received by the data driver, so as to obtain the required second display data based on the input data signal.

Hereinafter, in the embodiments of the present disclosure, taking the operation flow of the data driver illustrated in FIG. 3 as an example, the control method for the data driver provided by the embodiments of the present disclosure is illustrated. However, it should be noted that the embodiments of the present disclosure include but are not limited to this case.

Figure 3:
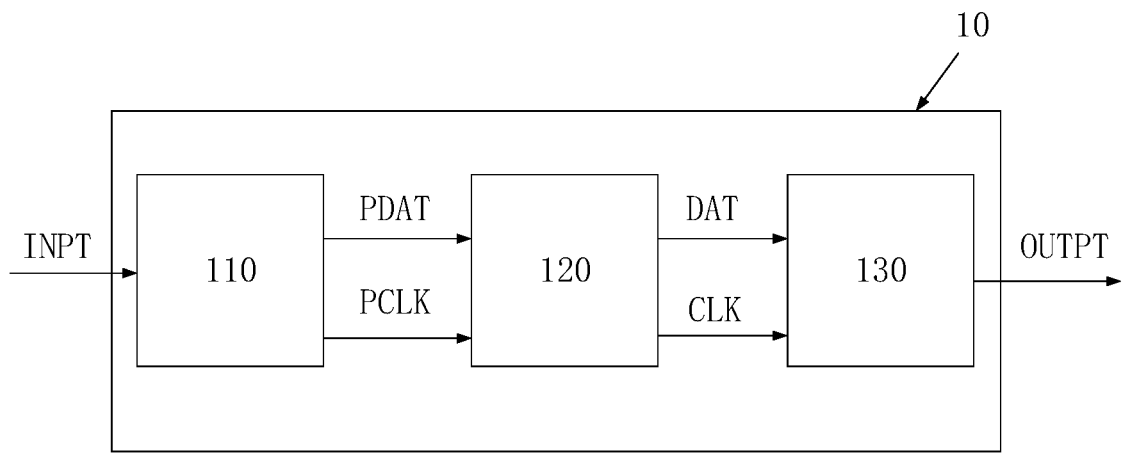
FIG. 3 is a schematic diagram of a data driver provided by some embodiments of the present disclosure.

FIG. 3 is a schematic diagram of a data driver provided by some embodiments of the present disclosure. As illustrated in FIG. 3, the data driver 10 includes a physical layer processing module 110, a link layer processing module 120, and a channel array processing module 130.

For example, after the data driver 10 receives an input electrical signal INPT provided by the timing controller, the input electrical signal INPT successively passes through the physical layer processing module 110, the link layer processing module 120 and the channel array processing module 130. After the input electrical signal INPT is subject to signal processing successively by the physical layer processing module 110, the link layer processing module 120 and the channel array processing module 130, a display electrical signal OUTPT to be provided to the display panel is obtained. For example, the display electrical signal OUTPT may be a display voltage or a display current applied to sub-pixels in respective pixel rows of the display panel, so as to drive the respective sub-pixels in the display panel for display.

For example, after receiving the input electrical signal INPT provided by the timing controller, the physical layer processing module 110 performs physical layer processing on the input electrical signal INPT to obtain an input data signal PDAT and an input clock signal PCLK corresponding thereto, and respectively transmits the obtained input data signal PDAT and input clock signal PCLK to the link layer processing module 120.

For example, the input electrical signal INPT provided by the timing controller which is received by the data driver 10 may be transmitted to the data driver 10 in a serial manner, or may also be transmitted to the data driver 10 in a parallel manner, or may also be transmitted in other applicable manners, which will not be specifically limited in the embodiments of the present disclosure.

Figure 4:
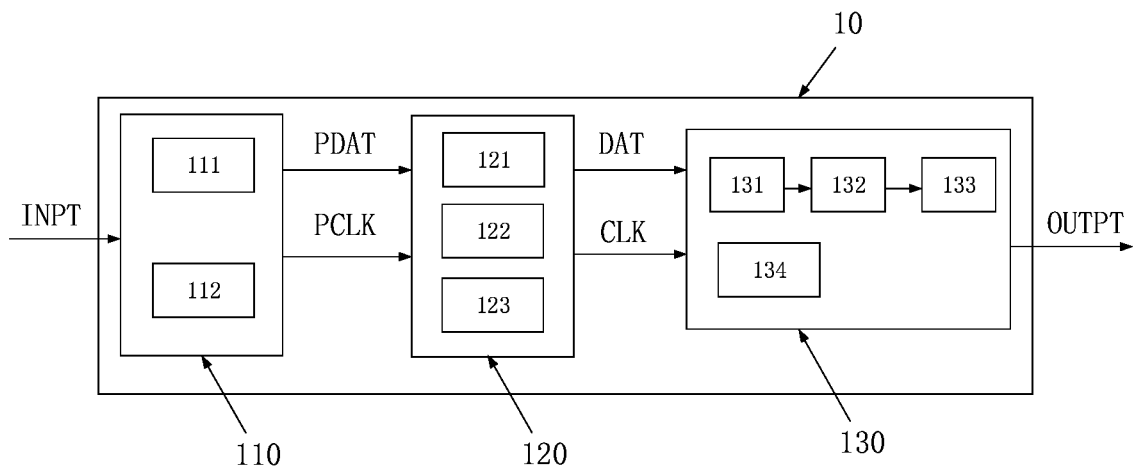
FIG. 4 is a schematic diagram of an implementation example of the data driver illustrated in FIG. 3.

For example, taking the example of the data driver 10 illustrated in FIG. 4 as an example, when the input electrical signal INPT is transmitted to the data driver 10 in a serial manner, that is, when the input data signal PDAT and the input clock signal PCLK included in the input electrical signal INPT are transmitted to the data driver 10 in a serial manner, an analog front-end sub-module 111 in the physical layer processing module 110 is configured to perform signal processing operations on the input electrical signal INPT, for example, signal amplification, frequency conversion, modulation and demodulation, adjacent frequency processing, level adjustment and control, etc., so as to obtain a stable electrical signal applicable to the data driver 10, and provide the processed input electrical signal INPT to other sub-modules in the physical layer processing module 110 for subsequent signal processing operations. For example, the input electrical signal INPT processed by the analog front-end sub-module 111 is transmitted to a clock data recovery sub-module 112. The clock data recovery sub-module 112 recovers and samples the processed input electrical signal INPT, extracts the input data signal PDAT and the input clock signal PCLK, respectively, and then respectively transmits the extracted input data signal PDAT and input clock signal PCLK to the subsequent link layer processing module 120.

Figure 5:
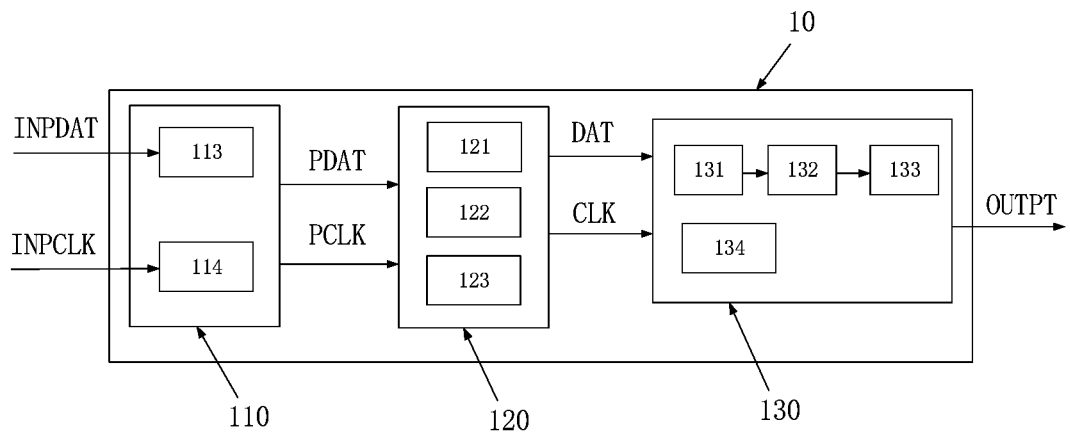
FIG. 5 is a schematic diagram of another implementation example of the data driver illustrated in FIG. 3.

For another example, taking the example of the data driver 10 illustrated in FIG. 5 as an example, when the input electrical signal INPT is transmitted to the data driver 10 in a parallel manner, that is, the input electrical signal INPDAT corresponding to the input data signal PDAT and the input electrical signal INPCLK corresponding to the input clock signal PCLK are transmitted to the data driver 10 respectively through different signal transmission channels, the input electrical signal INPDAT corresponding to the input data signal PDAT is transmitted to a data path sub-module 113 in the physical layer processing module 110, and the input electrical signal INPCLK corresponding to the input clock signal PCLK is transmitted to a clock path sub-module 114 in the physical layer processing module 110.

For example, the data path sub-module 113 performs signal processing operations (for example, signal amplification, frequency conversion, modulation and demodulation, adjacent frequency processing, level adjustment and control, etc.) on the received input electrical signal INPDAT, so as to obtain a stable electrical signal applicable to the data driver 10, recovers and samples the electrical signal which has undergone the above-described signal processing operations to extract a corresponding input data signal PDAT, and then transmits the extracted input data signal PDAT to the subsequent link layer processing module 120. The clock path sub-module 114 performs signal processing operations (for example, signal amplification, frequency conversion, modulation and demodulation, adjacent frequency processing, level adjustment and control, etc.) on the received input electrical signal INPCLK, so as to obtain a stable electrical signal applicable to the data driver 10, recovers and samples the electrical signal which has undergone the above-described signal processing operations to extract a corresponding input clock signal PCLK, and then transmits the extracted input clock signal PCLK to the subsequent link layer processing module 120.

It should be noted that except for the different modes of transmitting the input electrical signal INPT to the data driver 10 and the different structures of the physical layer processing module 110, other structures, functions or implementations of the data driver 10 illustrated in FIG. 4 and FIG. 5 are substantially the same or similar, and details will not be repeated here.

Figure 6:
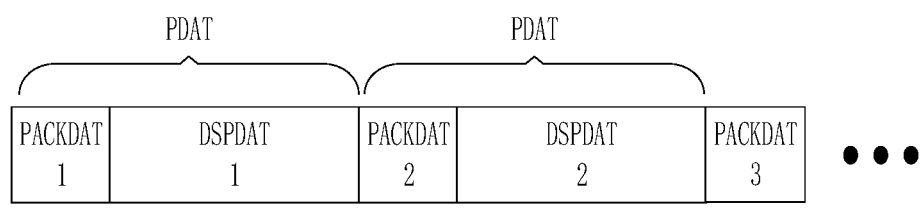
FIG. 6 is a schematic diagram of an input data signal provided by some embodiments of the present disclosure.

For example, the input data signal PDAT transmitted by the physical layer processing module 110 to the link layer processing module 120 may be as illustrated in FIG. 6. For example, the input data signal PDAT may include display data signals DSPDAT corresponding to respective pixel rows, for example, a first display data signal DSPDAT1 corresponding to the first pixel row, a second display data signal DSPDAT2 corresponding to the second pixel row, a third display data signal DSPDAT3 corresponding to the third pixel row, and so on. For example, in the example as described above, the display data signals DSPDAT and the clock signal may be transmitted together after combination thereof, and then separated from each other by the clock data recovery sub-module 112.

For example, the input data signal PDAT further includes a data packet control signal PACKDAT, for example, a first data packet control signal PACKDAT1 corresponding to the first display data signal DSPDAT1, a second data packet control signal PACKDAT2 corresponding to the second display data signal DSPDAT2, a third data packet control signal PACKDAT3 corresponding to the third display data signal DSPDAT3, and so on. For example, the data packet control signal PACKDAT is not transmitted in combination with the clock signal.

Thus, after identifying the data packet control signal PACKDAT and the display data signal DSPDAT in the input data signal PDAT, the display data DAT identified from the display data signal DSPDAT may be made respectively correspond to a corresponding pixel row according to the data control packet identified from the data packet control signal PACKDAT.

For example, as illustrated in FIG. 3, the link layer processing module 120 performs link layer processing respectively on the input data signal PDAT and the input clock signal PCLK which are received, identifies and obtains the display data DAT (and the data control packet) from the input data signal PDAT, identifies and obtains clock control data CLK from the input clock signal PCLK, and transmits the obtained display data DAT and clock control data CLK to the channel array processing module 130 after corresponding data processing (e.g., performing formatting processing on the display data DAT, etc.).

For example, as illustrated in FIG. 4 and FIG. 5, the link layer processing module 120 may include a signal identifying sub-module 121, a data control packet register sub-module 122, and a display data formatting sub-module 123. The signal identifying sub-module 121 may be configured to respectively identify the input data signal PDAT and the input clock signal PCLK received from the physical layer processing module 110, so as to identify the display data DAT and the data control packet from the input data signal PDAT, and to identify the clock control data CLK from the input clock signal PCLK. The data control packet register sub-module 122 may be configured to register the data control packet identified from the input data signal PDAT. The display data formatting sub-module 123 may be configured to perform operations (such as formatting) on the display data DAT identified from the input data signal PDAT, so as to provide the display data DAT which has undergone signal processing (for example, formatting) to the subsequent channel array processing module 130.

For example, as illustrated in FIG. 3, the channel array processing module 130 may cache the display data DAT and the clock control data CLK received, and perform signal processing operations (for example, digital-analog conversion, operational amplification, etc.) on the cached display data DAT to obtain a display electrical signal OUTPT (for example, a display voltage, a display current, or the like) which is provided to the display panel, so as to provide the obtained display electrical signal OUTPT to the display panel under the control of the clock control data CLK, thereby driving respective sub-pixels in the display panel for display.

For example, in combination with FIG. 4 and FIG. 5, in at least one example, the channel array processing module 130 may include a first latching sub-module 131 and a second latching sub-module 132 which are cascaded. The first latching sub-module 131 and the second latching sub-module 132 are configured to cache the display data DAT to be provided to the display panel. For example, in an m-th operation cycle (e.g., a clock cycle) of the channel array processing module 130, the first latching sub-module 131 caches display data used for an a-th pixel row, while the second latching sub-module 132 caches display data used for an (a−1)-th pixel row. Here, display driving of the (a−1)-th pixel row is previous to that of the a-th pixel row; in the next operation cycle of the channel array processing module 130, that is, in an (m+1)-th operation cycle, the first latching sub-module 131 will cache display data used for an (a+1)-th pixel row, while the second latching sub-module 132 will cache display data used for the a-th pixel row; and so on in subsequent operation cycles. Thus, the first latching sub-module 131 and the second latching sub-module 132 operate in parallel with each other. When the first latching sub-module 131 samples and caches the input display data, the second latching sub-module 132 transfers the cached display data to a next level, thereby improving operation efficiency of the channel array processing module 130.

The channel array processing module 130 further includes a conversion processing sub-module 133. For example, the conversion processing sub-module 133 may be configured to perform signal processing operations (for example, digital-analog conversion, operational amplification, etc.) on the cached display data DAT, so as to obtain a display electrical signal OUTPT (for example, a display voltage, a display current, or the like) to be provided to the display panel. The channel array processing module 130 further includes a shift register sub-module 134, and the shift register sub-module 134 may be configured to register the clock control data CLK received by the channel array processing module 130.

It should be noted that in the above-described embodiments of the present disclosure, the modules included in the data driver 10 illustrated in FIG. 3 to FIG. 5 and the sub-modules included in the respective modules are only exemplary illustration, the data driver 10 may further include other modules or sub-modules, and the respective modules may further include other sub-modules. The conventional design in the art may be referred to for details about the structure and the function of the data driver 10, and details will not be repeated here.

For example, taking the data driver 10 illustrated in FIG. 3 to FIG. 5 as an example, in some embodiments of the present disclosure, the electrical signal corresponding to the data comparison signal CMP may be included in the input electrical signal INPT and provided to the data driver 10 by the timing controller.

For example, in other embodiments of the present disclosure, the electrical signal corresponding to the data comparison signal CMP may also be transmitted to the data driver 10 independently of the input electrical signal INPT. For example, the electrical signal corresponding to the data comparison signal CMP may be provided by the timing controller or by other control apparatus or module in signal connection with the data driver 10, which will not be specifically limited in the embodiments of the present disclosure.

For example, taking that the electrical signal corresponding to the data comparison signal CMP is included in the input electrical signal INPT for transmission as an example, the electrical signal corresponding to the data comparison signal CMP for representing the comparison relationship between the first display data and the second display data may be transmitted together with the input data signal PDAT corresponding to the second pixel row, for example, transmitted together with the second data packet control signal PACKDAT2 in the input data signal PDAT, or taken as one of fields of the second data packet control signal PACKDAT2, and therefore the electrical signal corresponding to the data comparison signal CMP may be transmitted during a transmission time period of the second data packet control signal PACKDAT2 illustrated in FIG. 6. Thus, after the link layer processing module 120 receives the input data signal PDAT transmitted by the physical layer processing module 110, the signal identifying sub-module 121 may be caused to identify the data comparison signal CMP before identifying the second display data from the input data signal PDAT, so as to facilitate controlling the operation state of the data driver 10 according to the identified data comparison signal CMP.

It should be noted that in some other embodiments of the present disclosure, the electrical signal corresponding to the data comparison signal CMP may also be transmitted during other time period, for example, transmitted in an interval time period between the input data signal PDAT corresponding to the first pixel row and the input data signal PDAT corresponding to the second pixel row. For example, the time period in which the data comparison signal CMP is identified in the data driver 10 is satisfied such that the signal identifying sub-module 121 may identify the data comparison signal CMP before identifying the second display data, or is satisfied such that the data comparison signal CMP is identified in the data driver 10 before performing other signal processing operations on the identified second display data. The time period in which the data comparison signal CMP is identified in the data driver 10 will not be specifically limited in the embodiments of the present disclosure.

Hereinafter, taking the different examples of the data driver 10 illustrated in FIG. 4 and FIG. 5 as an example, the specific method for controlling the operation state of the data driver 10 according to the data comparison signal CMP in the above-described Step S12 will be illustrated exemplarily.

Figure 7:
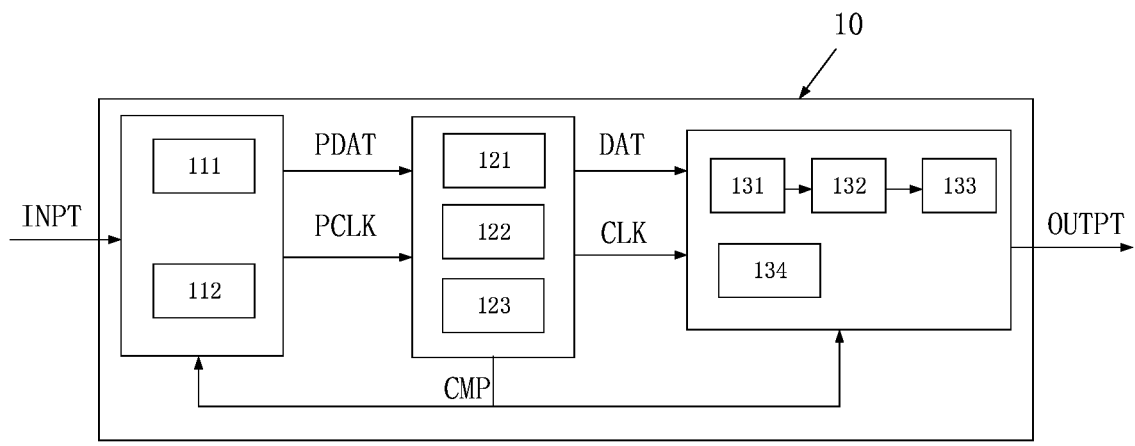
FIG. 7 is a schematic diagram of an operation state of the example of the data driver illustrated in FIG. 4.

FIG. 7 is a schematic diagram of an operation state of the example of the data driver illustrated in FIG. 4. For example, FIG. 7 shows operation states of different sub-modules in the data driver 10 in the case where the data comparison signal CMP represents that the first display data and the second display data have a second comparison relationship (e.g., there is no identical or reverse relationship between the first display data and the second display data).

Figure 8:
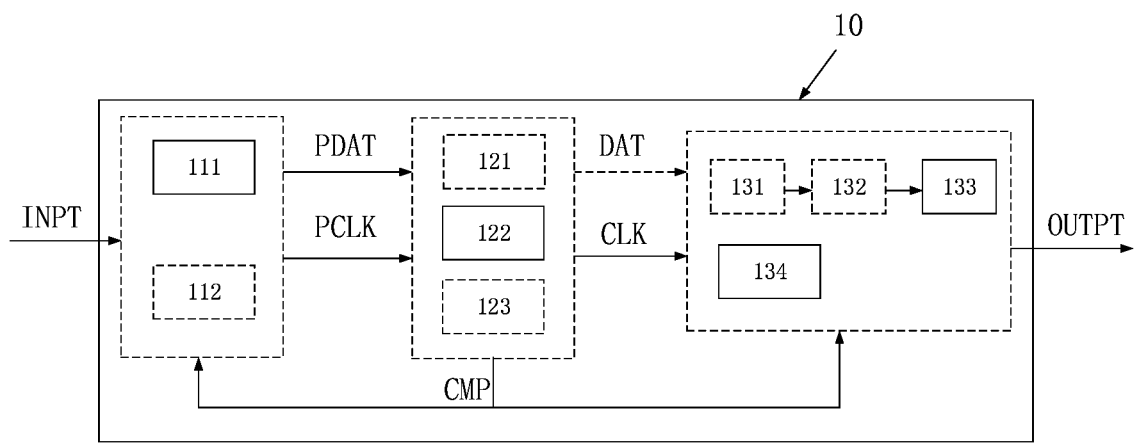
FIG. 8 is a schematic diagram of another operation state of the example of the data driver illustrated in FIG. 4.

FIG. 8 is a schematic diagram of another operation state of the example of the data driver illustrated in FIG. 4. For example, FIG. 8 shows operation states of different sub-modules in the data driver 10 in the case where the data comparison signal CMP represents that the first display data and the second display data have a first comparison relationship (i.e., the first display data is identical or reverse to the second display data).

For example, as illustrated in FIG. 7 and FIG. 8, after the data comparison signal CMP is identified by the signal identifying sub-module 121, the data comparison signal CMP may be provided to other sub-modules in the data driver 10. For example, the link layer processing module 120 may transmit the data comparison signal CMP respectively to the physical layer processing module 110 and the channel array processing module 130, thereby controlling operation states of other sub-modules.

For example, in the case where the first display data and the second display data have the second comparison relationship as illustrated in FIG. 7, the physical layer processing module 110 (and the respective sub-modules in the physical layer processing module 110), the link layer processing module 120 (and the respective sub-modules in the link layer processing module 120), and the channel array processing module 130 (and the respective sub-modules in the channel array processing module 130) in the data driver 10 are all in the second operation state, for example, in a normal operation state.

For example, in the case where the first display data and the second display data have the first comparison relationship as illustrated in FIG. 8, the physical layer processing module 110, the link layer processing module 120, or the channel array processing module 130 in the data driver 10 may respectively be in the first operation state different from the second operation state. For example, the first operation state may be understood as at least one sub-module in the module being in an inactive state (e.g., an abnormal operation state, a disabled state, etc., and those in examples described later are similar thereto), or may also be understood as some functions or some operations in the module or the sub-module being in an inactive state, so that power consumption of the respective modules in the first operation state is less than that in the second operation state, for example, the respective modules are in a low-power-consumption operation state relative to the normal operation state.

It should be noted that, as compared with the respective modules and the respective sub-modules in the second operation state (e.g., the normal operation state) as illustrated in FIG. 7, the corresponding modules and sub-modules in the first operation state (e.g., the inactive state or the abnormal operation state) are indicated by a dotted frame in FIG. 8.

For example, as illustrated in FIG. 7, in the case where the first display data and the second display data have the second comparison relationship, in the process of performing signal processing on the input electrical signal INPT to obtain the display electrical signal OUTPT to be provided to the display panel, the clock data recovery sub-module 112 in the physical layer processing module 110 needs to perform physical layer processing on the input electrical signal INPT received by the data driver 10, to extract the input data signal PDAT from the input electrical signal INPT; the signal identifying sub-module 121 and the display data formatting sub-module 123 in the link layer processing module 120 need to perform link layer processing on the received input data signal PDAT, for example, respectively extracting the second display data from the input data signal PDAT and performing formatting processing on the extracted second display data, or the like; and the first latching sub-module 131 and the second latching sub-module 132 in the channel array processing module 130 need to latch the second display data received from the link layer processing module 120.

For example, as illustrated in FIG. 8, in the case where the first display data and the second display data have the first comparison relationship, after the channel array processing module 130 receives the data comparison signal CMP provided by the link layer processing module 120, the second latching sub-module 132 in the channel array processing module 130 may obtain the second display data based on the cached first display data, in response to the data comparison signal CMP. Thus, the second latching sub-module 132 is allowed to no longer need to receive the second display data transmitted from the first latching sub-module 131; accordingly, the first latching sub-module 131 no longer needs to receive or latch the second display data provided by the link layer processing module 120, and no longer needs to transmit the second display data to the second latching sub-module 132. Further, the first latching sub-module 131 may be in an inactive state, and some functions or some operations in the second latching sub-module 132 may be in an inactive state, so that power consumption of the channel array processing module 130 in the first operation state is less than that in the second operation state.

For example, in the case where the first display data is identical to the second display data, the channel array processing module 130 may output the first display data which has been cached in the second latching sub-module 132 as the second display data.

For example, in the case where the first display data is reverse to the second display data, the channel array processing module 130 may reverse the first display data which has been cached in the second latching sub-module 132 to obtain the second display data. For example, the reverse operation may be executed in the second latching sub-module 132, or may also be executed in other sub-modules in the channel array processing module 130; alternatively, the reverse operation may also be executed in other sub-modules that do not belong to the channel array processing module 130, and the embodiments of the present disclosure are not specifically limited in this aspect.

For example, as illustrated in FIG. 8, in the case where the first display data and the second display data have the first comparison relationship, since the link layer processing module 120 does not need to provide the second display data to the channel array processing module 130, the display data formatting sub-module 123 in the link layer processing module 120 may be in an inactive state in response to the data comparison signal CMP, and some functions or some operations in the signal identifying sub-module 121 may be in an inactive state in response to the data comparison signal CMP, for example, some functions and some operations in the signal identifying sub-module 121 for extracting the second display data from the input data signal PDAT may be in an inactive state, so that power consumption of the link layer processing module 120 in the first operation state is less than that in the second operation state.

For example, as illustrated in FIG. 8, in the case where the first display data and the second display data have the first comparison relationship, after the physical layer processing module 110 receives the data comparison signal CMP provided by the link layer processing module 120, some functions or some operations in the clock data recovery sub-module 112 in the physical layer processing module 110 may be in an inactive state in response to the data comparison signal CMP, for example, some functions and some operations of the clock data recovery sub-module 112 for extracting the input data signal PDAT from the input electrical signal INPT may be in an inactive state, so that power consumption of the physical layer processing module 110 in the first operation state is less than that in the second operation state.

For example, in some other examples of the present disclosure, in the case where the first display data and the second display data have the first comparison relationship, some functions or some operations in the analog front-end sub-module 111 in the physical layer processing module 110 may also be in an inactive state or receive a constant-level electrical signal in response to the data comparison signal CMP, so as to facilitate reducing the power consumption of the physical layer processing module 110 in the first operation state.

Figure 9:
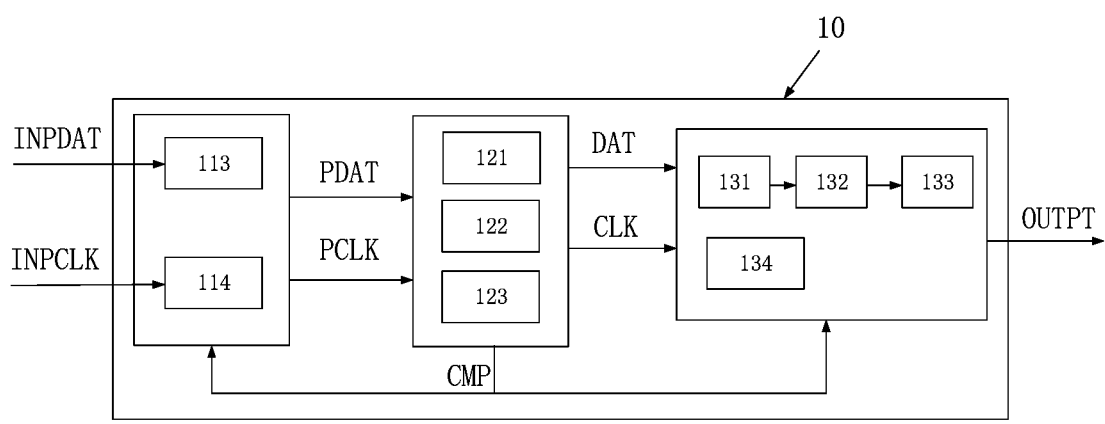
FIG. 9 is a schematic diagram of an operation state of the example of the data driver illustrated in FIG. 5.

FIG. 9 is a schematic diagram of an operation state of the example of the data driver illustrated in FIG. 5. For example, FIG. 9 shows operation states of different sub-modules in the data driver 10 in the case where the data comparison signal CMP represents that the first display data and the second display data have the second comparison relationship (i.e., there is no identical or reverse relationship between the first display data and the second display data).

Figure 10:
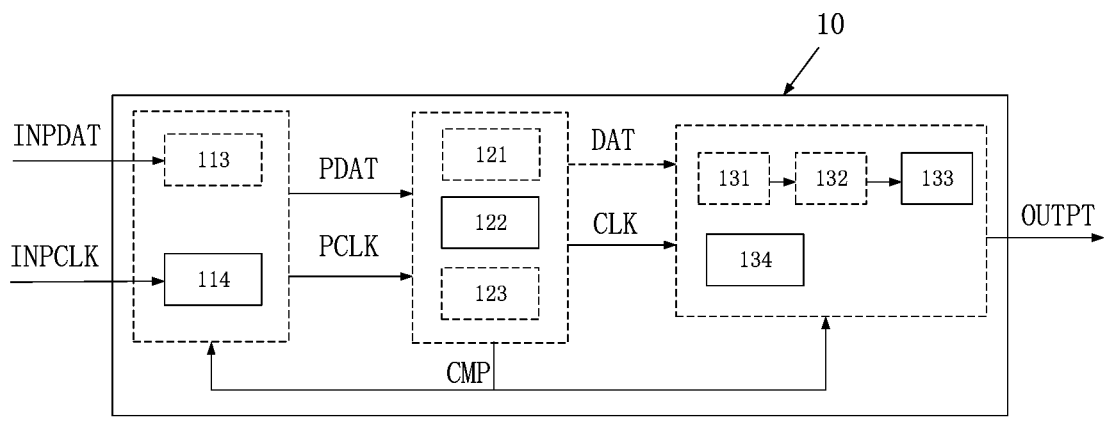
FIG. 10 is a schematic diagram of another operation state of the example of the data driver illustrated in FIG. 5.

FIG. 10 is a schematic diagram of another operation state of the example of the data driver illustrated in FIG. 5. For example, FIG. 10 shows operation states of different sub-modules in the data driver 10 in the case where the data comparison signal CMP represents that the first display data and the second display data have the first comparison relationship (i.e., the first display data is identical or reverse to the second display data).

It should be noted that the control methods for the example of the data driver illustrated in FIG. 9 and FIG. 10 are substantially similar to the control methods for the example of the data driver illustrated in FIG. 7 and FIG. 8 as described above, and details will not be repeated here.

For example, as illustrated in FIG. 9, in the case where the first display data and the second display data have the second comparison relationship, the data path sub-module 113 in the physical layer processing module 110 performs signal processing operations (e.g., corresponding to the signal processing operations in the analog front-end sub-module 111 in FIG. 7), such as signal amplification, frequency conversion, modulation and demodulation, adjacent frequency processing, level adjustment and control, or the like on the received input electrical signal INPDAT corresponding to the input data signal PDAT to obtain a stable electrical signal applicable to the data driver 10, recovers and samples the electrical signal which has undergone the above-described signal processing operations, extracts the corresponding input data signal PDAT therefrom (e.g., corresponding to some signal processing operations in the clock data recovery sub-module 112 in FIG. 7), and then transmits the extracted input data signal PDAT to the subsequent link layer processing module 120.

For example, as illustrated in FIG. 10, in the case where the first display data and the second display data have the first comparison relationship, after the physical layer processing module 110 receives the data comparison signal CMP provided by the link layer processing module 120, at least some functions or at least some operations of the data path sub-module 113 in the physical layer processing module 110 may be in an inactive state in response to the data comparison signal CMP, so that the power consumption of the physical layer processing module 110 in the first operation state is less than that in the second operation state.

For example, some signal processing functions and operations in the data path sub-module 113 that are used for implementing, for example, those corresponding to the analog front-end sub-module 111 may be in an inactive state, and some signal processing functions and operations in the data path sub-module 113 that are used for implementing, for example, those corresponding to the clock data recovery sub-module 112 may be in an inactive state.

For example, in some examples of the present disclosure, in the example of the operation state illustrated in FIG. 10, some sub-modules in the data path sub-module 113 that are configured to implement, for example, some signal processing functions and operations corresponding to those in the analog front-end sub-module 111 may also be in an inactive state or receive a constant-level electrical signal, so as to facilitate further reducing the power consumption of the physical layer processing module 110 in the first operation state.

Figure 11:
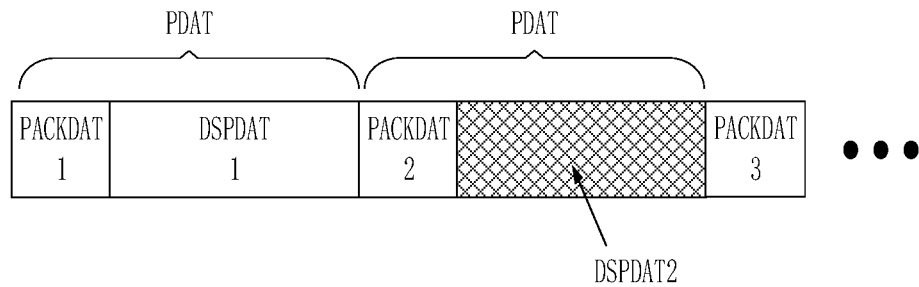
FIG. 11 is a schematic diagram of another input data signal provided by some embodiments of the present disclosure.

For example, in some embodiments of the present disclosure, in the case where the first display data and the second display data have the first comparison relationship, within a time period when transmitting the input data signal PDAT corresponding to the second display data, the timing controller may also stop transmitting a valid electrical signal to the data driver 10 or transmit a virtual electrical signal to the data driver 10. For example, the input data signal PDAT received by the link layer processing module 120 in the data driver 10 may be as illustrated in FIG. 11, and the second display data signal DSPDAT2 corresponding to the second display data may be a virtual electrical signal or an electrical signal that maintains a constant level, so as to further reduce the power consumption of the corresponding module or sub-module in the data driver 10 that serves for the input data signal PDAT in the first operation state.

For example, in some embodiments of the present disclosure, in the case where the first display data and the second display data have the first comparison relationship, the corresponding module in the data driver 10 (e.g., the link layer processing module 120) may no longer receive the input data signal PDAT, so as to further reduce the power consumption of the corresponding module or sub-module in the data driver 10 that serves for the input data signal PDAT in the first operation state.

For example, driving display sequences of the first pixel row and the second pixel row may be adjacent to each other in terms of time, that is, after the first pixel row is driven to display, the next pixel row driven to display in the display panel is the second pixel row.

Figure 12:
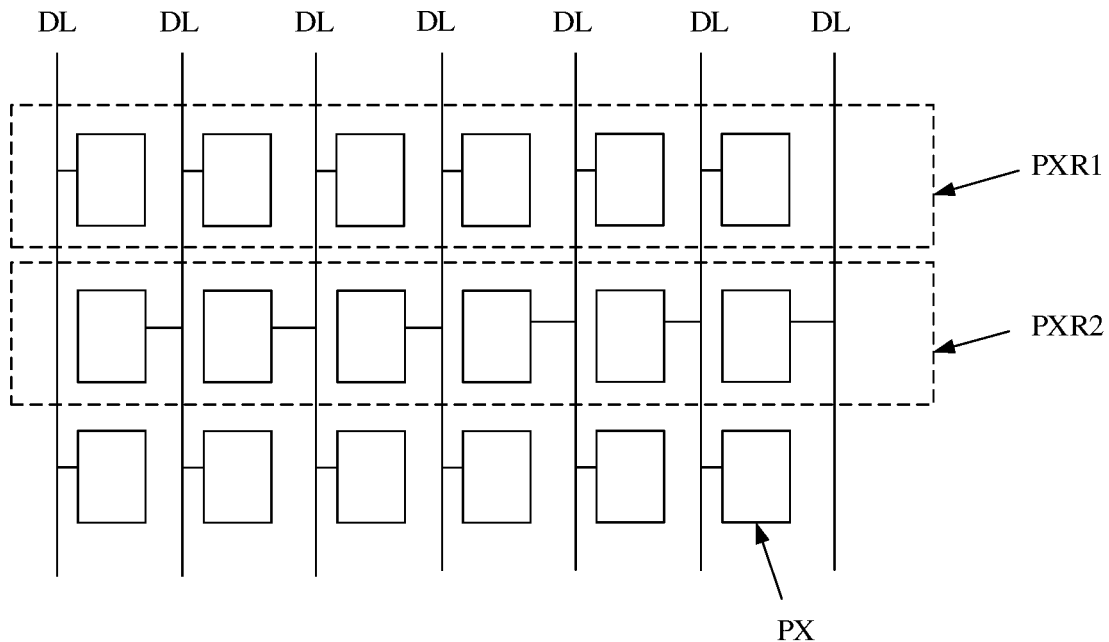
FIG. 12 is a schematic diagram of a first pixel row and a second pixel row provided by some embodiments of the present disclosure.

For example, as illustrated in FIG. 12, the first pixel row PXR1 and the second pixel row PXR2 may be two pixel rows arranged adjacent to each other in the display panel. For example, respective sub-pixels PX in the first pixel row PXR1 may be controlled by the same gate line, and respective sub-pixels PX in the second pixel row PXR2 may be controlled by another gate line. For example, after a corresponding display electrical signal OUTPT, for example, a display voltage, a display current, or the like, is applied to the sub-pixels PX in the first pixel row PXR1 through a plurality of signal lines DL (e.g., data lines), so that the first pixel row PXR1 is driven to display, a corresponding display electrical signal OUTPT is applied to the sub-pixels PX in the second pixel row PXR2 through the plurality of signal lines DL, so that the second pixel row PXR2 is driven to display.

It should be noted that in the embodiments of the present disclosure, the flow of the control method for the data driver provided by the above-described respective embodiments of the present disclosure may include more or fewer operations, and these operations may be executed in serial or in parallel. Although the flow of the control method for the data driver as described above includes a plurality of operations in a specific order, it should be clearly understood that the order of the plurality of operations is not limited. The control method for the data driver as described above may be executed once or multiple times according to a predetermined condition.

Figure 13:
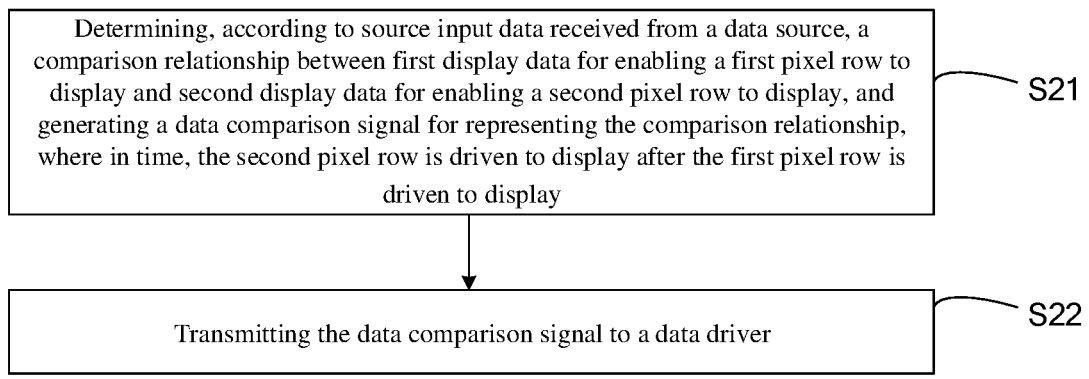
FIG. 13 is a schematic flowchart of a control method for a timing controller provided by some embodiments of the present disclosure.

FIG. 13 is a schematic flowchart of a control method for a timing controller provided by some embodiments of the present disclosure.

As illustrated in FIG. 13, the control method for the timing controller provided by the embodiments of the present disclosure includes steps S21 and S22.

Step S21: determining, according to source input data received from a data source, a comparison relationship between first display data for enabling a first pixel row to display and second display data for enabling a second pixel row to display, and generating a data comparison signal for representing the comparison relationship, where in time, the second pixel row is driven to display after the first pixel row is driven to display.

Step S22: transmitting the data comparison signal to a data driver.

In the control method for the timing controller provided by the above-described embodiments of the present disclosure, by determining the comparison relationship between the second display data corresponding to the second pixel row to be driven to display and the first display data corresponding to the first pixel row to be driven to display previous to the second pixel row, and transmitting the generated data comparison signal representing the comparison relationship to the data driver, the data driver may be allowed to be in different operation states in response to the data comparison signal, so that operation power consumption of the data driver may be flexibly controlled, which is favorable for achieving advantageous effects of reducing the operation power consumption of the data driver and further reducing total system power consumption, so as to reduce use costs.

In some embodiments of the present disclosure, the above-described control method for the timing controller may further include Step S23.

Step S23: disallowing to transmit an input data signal corresponding to the second display data to the data driver in response to the data comparison signal representing that the first display data and the second display data have a first comparison relationship, where the first comparison relationship includes the first display data being identical or reverse to the second display data.

For example, in the case where it is determined that the first display data is identical or reverse to the second display data, the data driver may be allowed to obtain the second display data based on the first display data which has been cached in the data driver, which is favorable for reducing the power consumption required by the data driver in the process of acquiring the second display data, and reducing total system power consumption of the data driver.

In addition, the control method for the timing controller provided by the above-described embodiments of the present disclosure may also reduce the operation current generated in the data driver by reducing total system power consumption of the data driver when the display panel adopting the timing controller is used for such as low voltage domain display, which is favorable for improving characteristics of signal transmission in the data driver, for example, the ability to resist high-frequency electromagnetic interference (EMI), wireless wide area network (WWAN) signal transmission performance, or the like, thereby improving stability and reliability of signal transmission.

For example, disallowing to transmit the input data signal corresponding to the second display data to the data driver in the above-described Step S23 includes: transmitting a virtual electrical signal to the data driver or stopping transmitting a valid electrical signal to the data driver during a time period of transmitting the input data signal corresponding to the second display data.

For example, in the case where it is determined that the first display data is identical or reverse to the second display data, the timing controller may be allowed to stop transmitting a valid electrical signal to the data driver or to transmit a virtual electrical signal to the data driver, that is, the second display data obtained in the data driver is no longer obtained by extracting from the input electrical signal transmitted by the timing controller, and the data driver is allowed to obtain the second display data according to the first display data which has been cached in the data driver. Thus, it is further favorable for reducing power consumption required by the timing controller and reducing total system power consumption of the timing controller.

It should be noted that in the embodiments of the present disclosure, the relevant description of the control method for the data driver described above may be referred to for specific operation flows, steps, technical effects, or the like of the control method for the timing controller, and details will not be repeated here.

At least one embodiment of the present disclosure further provides a data driver control apparatus, and the data driver control apparatus, by acquiring a comparison relationship between second display data corresponding to a second pixel row to be driven to display and first display data corresponding to a first pixel row to be driven to display previous to the second pixel row, may control the data driver to be in different operation states according to the comparison relationship, so as to flexibly control operation power consumption of the data driver, thereby facilitating achieving advantageous effects of reducing operation power consumption of the data driver and further reducing total system power consumption, and reducing use costs of the product.

Figure 14:
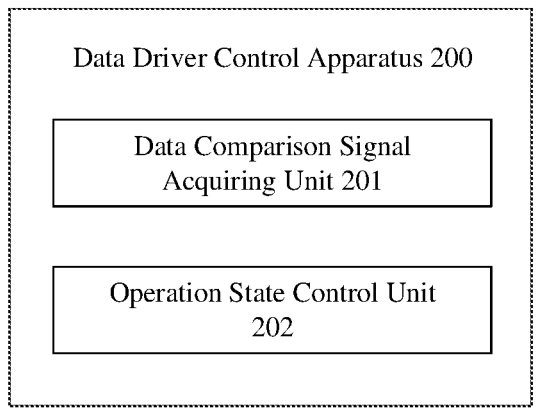
FIG. 14 is a schematic block diagram of a data driver control apparatus provided by some embodiments of the present disclosure.

FIG. 14 is a schematic block diagram of a data driver control apparatus provided by some embodiments of the present disclosure.

For example, as illustrated in FIG. 14, the data driver control apparatus 200 includes a data comparison signal acquiring unit 201 and an operation state control unit 202.

The data comparison signal acquiring unit 201 is configured to obtain a data comparison signal, where the data comparison signal represents a comparison relationship between first display data for enabling a first pixel row to display and second display data for enabling a second pixel row to display, and in time, the second pixel row is driven to display after the first pixel row is driven to display. For example, the data comparison signal acquiring unit 201 may execute Step S11 in the control method for the data driver illustrated in FIG. 1.

The operation state control unit 202 is configured to control an operation state of the data driver according to the data comparison signal. For example, the operation state control unit 202 may execute Step S12 in the control method for the data driver illustrated in FIG. 1.

For example, the data comparison signal acquiring unit 201 and the operation state control unit 202 include codes and programs stored in a memory; and a processor may execute the codes and the programs to implement some or all of the functions of the data comparison signal acquiring unit 201 and the operation state control unit 202 as described above. For example, the data comparison signal acquiring unit 201 and the operation state control unit 202 may be special-purpose hardware devices configured to implement some or all of the functions of the data comparison signal acquiring unit 201 and the operation state control unit 202 as described above. For example, the data comparison signal acquiring unit 201 and the operation state control unit 202 may be one circuit board or a combination of a plurality of circuit boards configured to implement the functions as described above. In the embodiments of the present disclosure, the one circuit board or the combination of a plurality of circuit boards may include: (1) one or more processors; (2) one or more non-transitory memories connected with the processor; and (3) processor-executable firmware stored in the memory.

It should be noted that the data comparison signal acquiring unit 201 is configured to implement Step S11 illustrated in FIG. 1, and the operation state control unit 202 is configured to implement Step S12 illustrated in FIG. 1. Thus, the relevant description of Step S11 illustrated in FIG. 1 in the embodiments of the control method for the data driver may be referred to for specific illustration of the data comparison signal acquiring unit 201, and the relevant description of Step S12 illustrated in FIG. 1 in the embodiments of the control method for the data driver may be referred to for specific illustration of the operation state control unit 202. In addition, the data driver control apparatus may achieve technical effects similar to those of the foregoing control method for the data driver, and details will not be repeated here.

At least one embodiment of the present disclosure further provides a timing controller, and the timing controller, by determining a comparison relationship between second display data corresponding to a second pixel row to be driven to display and first display data corresponding to a first pixel row to be driven to display previous to the second pixel row, and transmitting a generated data comparison signal representing the comparison relationship to a data driver, may allow the data driver to be in different operation states in response to the data comparison signal, so that operation power consumption of the data driver may be flexibly controlled, which is favorable for achieving advantageous effects of reducing operation power consumption of the data driver and further reducing total system power consumption, so as to reduce use costs.

Figure 15:
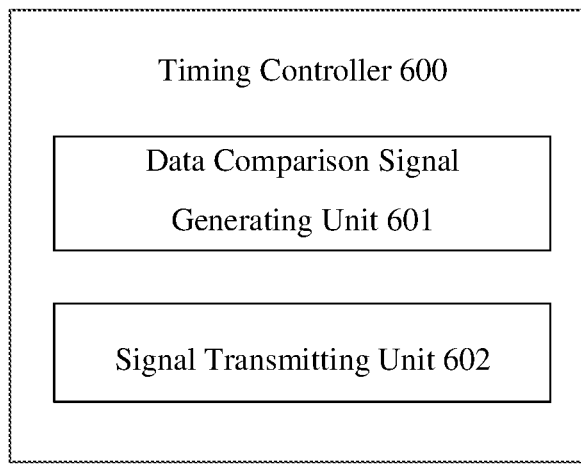
FIG. 15 is a schematic block diagram of a timing controller control apparatus provided by some embodiments of the present disclosure.

FIG. 15 is a schematic block diagram of a timing controller provided by some embodiments of the present disclosure.

For example, as illustrated in FIG. 15, the timing controller 600 includes a data comparison signal generating unit 601 and a signal transmitting unit 602.

The data comparison signal generating unit 601 is configured to determine, according to source input data received from a data source, a comparison relationship between first display data for enabling a first pixel row to display and second display data for enabling a second pixel row to display and generate a data comparison signal for representing the comparison relationship. In time, the second pixel row is driven to display after the first pixel row is driven to display. For example, the data comparison signal generating unit 601 may execute Step S21 in the control method for the timing controller illustrated in FIG. 13.

The signal transmitting unit 602 is configured to transmit the data comparison signal to a data driver. For example, the signal transmitting unit 602 may execute Step S22 in the control method for the timing controller illustrated in FIG. 13.

For example, the data comparison signal generating unit 601 and the signal transmitting unit 602 include codes and programs stored in a memory; and a processor may execute the codes and the programs to implement some or all of the functions of the data comparison signal generating unit 601 and the signal transmitting unit 602 as described above. For example, the data comparison signal generating unit 601 and the signal transmitting unit 602 may be special-purpose hardware devices configured to implement some or all of the functions of the data comparison signal generating unit 601 and the signal transmitting unit 602 as described above. For example, the data comparison signal generating unit 601 and the signal transmitting unit 602 may be one circuit board or a combination of a plurality of circuit boards configured to implement the functions as described above. In the embodiments of the present disclosure, the one circuit board or the combination of a plurality of circuit boards may include: (1)

one or more processors; (2) one or more non-transitory memories connected with the processor; and (3) processor-executable firmware stored in the memory.

It should be noted that the data comparison signal generating unit 601 is configured to implement Step S21 illustrated in FIG. 13, and the signal transmitting unit 602 is configured to implement Step S22 illustrated in FIG. 13. Thus, the relevant description of Step S21 illustrated in FIG. 13 in the embodiments of the control method for the timing controller may be referred to for specific illustration of the data comparison signal generating unit 601, and the relevant description of Step S22 illustrated in FIG. 13 in the embodiments of the control method for the timing controller may be referred to for specific illustration of the signal transmitting unit 602. In addition, the timing controller may achieve technical effects similar to those of the foregoing control method for the timing controller, and details will not be repeated here.

At least one embodiment of the present disclosure further provides an electronic device, and the electronic device includes a timing controller as described in any one embodiment of the present disclosure, for example, the timing controller 600 illustrated in FIG. 15. The electronic device further includes a data driver as described in any one embodiment of the present disclosure. For example, the data driver includes a data comparison signal acquiring unit and an operation state control unit, the data comparison signal acquiring unit is configured to obtain a data comparison signal, and the operation state control unit is configured to control an operation state of the data driver according to the data comparison signal. For example, the corresponding description of the data comparison signal acquiring unit 201 and the operation state control unit 202 in the data driver control apparatus 200 according to the above-described embodiments, or the corresponding description in the above-described embodiments of the control method for the data driver, for example, the corresponding description of the data driver 10 illustrated in FIG. 3 to FIG. 5 may be referred to for details of the data comparison signal acquiring unit and the operation state control unit included in the data driver, and details will not be repeated here.

In some embodiments of the present disclosure, the electronic device further includes a display panel, and the data driver is configured to provide display data to the display panel for driving pixel rows in the display panel to display.

Figure 16:
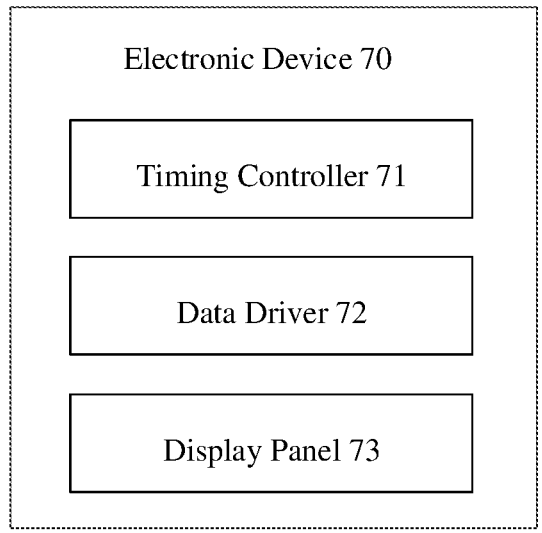
FIG. 16 is a schematic block diagram of an electronic device provided by some embodiments of the present disclosure.
Figure 17:
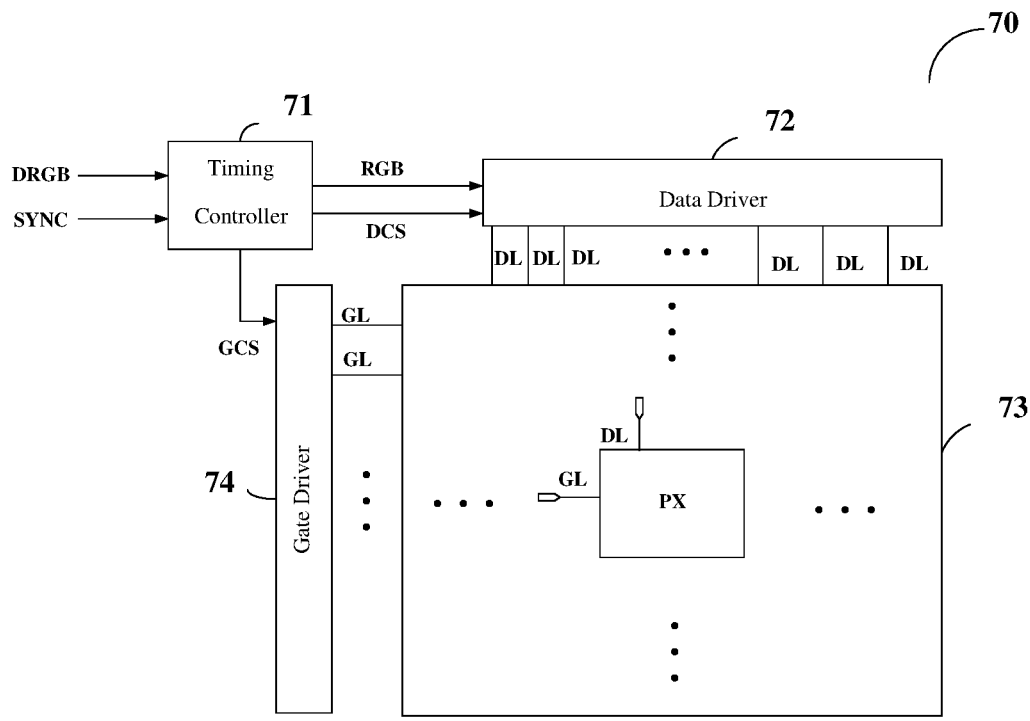
FIG. 17 is a schematic diagram of an example of an electronic device provided by some embodiments of the present disclosure.

FIG. 16 is a schematic block diagram of an electronic device provided by some embodiments of the present disclosure. FIG. 17 is a schematic diagram of an example of an electronic device provided by some embodiments of the present disclosure. For example, FIG. 17 is a schematic diagram of an example of the electronic device illustrated in FIG. 16.

For example, as illustrated in FIG. 16, the electronic device 70 includes a timing controller 71, a data driver 72, and a display panel 73. For example, the timing controller 71 may be a timing controller as described in any one embodiment of the present disclosure, for example, the timing controller 600 illustrated in FIG. 15. For example, the data driver 72 may be a data driver provided in any one embodiment of the present disclosure, for example, the data driver 10 illustrated in FIG. 3 to FIG. 5 may be referred to.

For example, the display panel 73 may be a liquid crystal panel, a liquid crystal television, an OLED panel, an OLED television, a QLED panel, a QLED television, a display, an electronic paper display apparatus, a mobile phone, a tablet computer, a laptop computer, a digital photo frame, a navigator, or any other product or component having a display function, and the embodiments of the present disclosure are not limited in this aspect.

For example, as illustrated in FIG. 17, in one example, the electronic device 70 further includes a gate driver 74.

For example, the data driver 72 is electrically connected with a pixel circuit in each sub-pixel PX through a plurality of data lines DL. For example, according to an input electrical signal provided by the timing controller 71, the data driver 72 provides a corresponding display electrical signal, for example, a display voltage, a display current, or the like to the sub-pixels PX in the display panel 73 through a plurality of data lines DL, so as to drive the respective sub-pixels PX in the display panel 73 to display. For example, referring to FIG. 17, the input electrical signal may include an electrical signal RGB corresponding to the input data signal, for example, the input electrical signal INPDAT illustrated in FIG. 5, and also include an electrical signal DCS corresponding to the input clock signal, for example, the input electrical signal INPCLK illustrated in FIG. 5. For example, the data driver 72 may be implemented as a semiconductor chip.

For example, the gate driver 74 is electrically connected with a pixel circuit in each sub-pixel PX through a plurality of gate lines GL, to provide each pixel circuit with a corresponding gate signal, etc. For example, the gate driver 74 provides a strobe signal, that is, a gate signal or a scanning signal, according to a plurality of gate control signals GCS provided by the timing controller 71. For example, the gate driver 74 may be implemented as a semiconductor chip, or may also be integrated in the display panel 73 to form a GOA circuit.

For example, the timing controller 71 is configured to process source input data DRGB input from outside the electronic device 70 (e.g., provided by a data source), provide the processed electrical signal RGB corresponding to the input data signal to the data driver 72, and respectively provide the gate control signal GCS and the electrical signal DCS corresponding to the input clock signal to the gate driver 74 and the data driver 72, so as to control the data driver 72 and the gate driver 74.

For example, the timing controller 71 processes the source input data DRGB input from outside, to match with size and resolution of the display panel 73, and then provides the processed electrical signal RGB to the data driver 72. For example, the timing controller 71 generates a gate control signal GCS and an electrical signal DCS by using a synchronization signal SYNC (e.g., a dot clock signal DCLK, a data enable signal DE, a horizontal synchronization signal Hsync, and a vertical synchronization signal Vsync) input from outside the electronic device 70. The timing controller 71 provides the electrical signal DCS and the gate control signal GCS generated respectively to the data driver 72 and the gate driver 74, for control of the data driver 72 and the gate driver 74.

For example, the electronic device 70 may further include other components, for example, a signal decoding circuit, etc., these components may, for example, be existing conventional components, and details will not be repeated here.

At least one embodiment of the present disclosure further provides an electronic device, and the electronic device includes a processor, a memory, and one or more computer program modules. The one or more computer program modules are stored in the memory and configured to be executed by the processor, and the one or more computer program modules include instructions for implementing a control method for a data driver or a control method for a timing controller provided by any one of the embodiments of the present disclosure.

Figure 18:
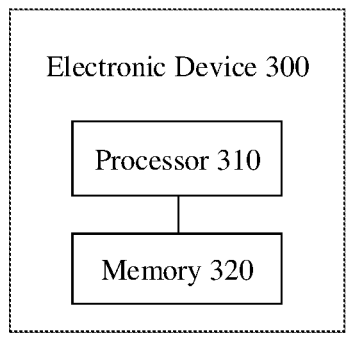
FIG. 18 is a schematic block diagram of another electronic device provided by some embodiments of the present disclosure.

FIG. 18 is a schematic block diagram of an electronic device provided by some embodiments of the present disclosure. As illustrated in FIG. 18, the electronic device 300 includes a processor 310 and a memory 320. The memory 320 is configured to store computer-executable instructions (e.g., one or more computer program modules) in a non-transitory manner. The processor 310 is configured to run the computer-executable instructions, and the computer-executable instructions, when executed by the processor 310, may perform one or more steps in the control method for the data driver as described above or perform one or more steps in the control method for the timing controller as described above. The memory 320 and the processor 310 may be interconnected by a bus system and/or other form of connection mechanism (not shown).

For example, the processor 310 may be a central processing unit (CPU), a graphics processing unit (GPU), or other form of processing unit having a data processing capability and/or a program execution capability. For example, the central processing unit (CPU) may be an X86 or ARM architecture. The processor 310 may be a general-purpose processor or a special-purpose processor, and may control other components in the electronic device 300 to execute desired functions.

For example, the memory 320 may include any combination of one or more computer program products, and the computer program products may include various forms of computer-readable storage media, for example, a volatile memory and/or a non-volatile memory. The volatile memory may include, for example, a random access memory (RAM) and/or a cache, or the like. The non-volatile memory may include, for example, a read only memory (ROM), a hard disk, an erasable programmable read only memory (EPROM), a portable compact disk read only memory (CD-ROM), a USB memory, a flash memory, or the like. One or more computer program modules may be stored on the computer-readable storage medium, and the processor 310 may run the one or more computer program modules, to implement various functions of the electronic device 300. Various applications and various data, as well as various data used and/or generated by the applications may also be stored on the computer-readable storage medium.

It should be noted that in the embodiments of the present disclosure, the description above of the control method for the data driver and the control method for the timing controller may be referred to for specific functions and technical effects of the electronic device 300, and details will not be repeated here.

Figure 19:
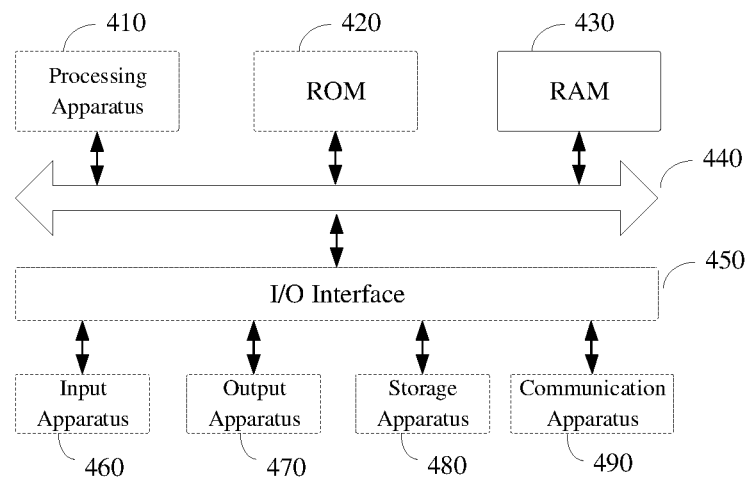
FIG. 19 is a schematic block diagram of still another electronic device provided by some embodiments of the present disclosure.

FIG. 19 is a schematic block diagram of another electronic device provided by some embodiments of the present disclosure. The electronic device 400 is, for example, applicable to implementing the control method for the data driver or the control method for the timing controller provided by the embodiments of the present disclosure. The electronic device 400 may be a terminal device or the like. It should be noted that the electronic device 400 illustrated in FIG. 19 is only an example, and will not impose any limitations on the function and scope of use of the embodiments of the present disclosure.

As illustrated in FIG. 19, the electronic device 400 may include a processing apparatus (e.g., a central processing unit, a graphics processing unit, etc.) 410, which may execute various appropriate actions and processing according to a program stored in a read-only memory (ROM) 420 or a program loaded from a storage apparatus 480 into a random access memory (RAM) 430. The random access memory (RAM) 430 further stores various programs and data required for operation of the electronic device 400. The processing apparatus 410, the ROM 420, and the RAM 430 are connected with each other through a bus 440. An input/output (I/O) interface 450 is also connected to the bus 440.

Usually, apparatuses below may be connected to the I/O interface 450: an input apparatus 460 including, for example, a touch screen, a touch pad, a keyboard, a mouse, a camera, a microphone, an accelerometer, a gyroscope, or the like; an output apparatus 470 including, for example, a liquid crystal display (LCD), a speaker, a vibrator, or the like; a storage apparatus 480 including, for example, a magnetic tape, a hard disk, or the like; and a communication apparatus 490. The communication apparatus 490 may allow the electronic device 400 to perform wireless or wired communication with other electronic devices so as to exchange data. Although FIG. 19 shows the electronic device 400 having various apparatuses, it should be understood that, it is not required to implement or have all the apparatuses illustrated, and the electronic device 400 may alternatively implement or have more or fewer apparatuses.

For example, according to the embodiments of the present disclosure, the control method for the data driver or the control method for the timing controller as described above may be implemented as computer software programs. For example, the embodiments of the present disclosure include a computer program product, including a computer program carried on a non-transitory computer-readable medium, and the computer program includes program codes for executing the control method for the data driver or the control method for the timing controller as described above. In such embodiments, the computer program may be downloaded and installed from the network via the communication apparatus 490, or installed from the storage apparatus 480, or installed from the ROM 420. When executed by the processing apparatus 410, the computer program may implement the functions determined in the control method for the data driver or the control method for the timing controller provided by the embodiments of the present disclosure.

Figure 20:
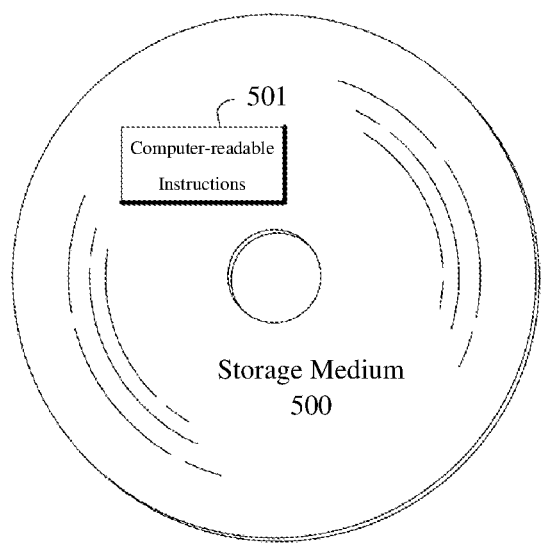
FIG. 20 is a schematic diagram of a storage medium provided by some embodiments of the present disclosure.

FIG. 20 is a schematic diagram of a storage medium provided by some embodiments of the present disclosure. For example, as illustrated in FIG. 20, the storage medium 500 may be a non-transitory computer-readable storage medium, and one or more computer-readable instructions 501 may be stored non-temporally on the storage medium 500. For example, when executed by the processor, the computer-readable instructions 501 may execute one or more steps of the control method for the data driver or the control method for the timing controller as described above.

For example, the storage medium 500 may be applied to the above-described electronic device. For example, the storage medium 500 may include a memory in the electronic device.

For example, the storage medium may include a memory card of a smart phone, a storage component of a tablet computer, a hard disk of a personal computer, a random access memory (RAM), a read-only memory (ROM), an erasable programmable read-only memory (EPROM), a portable compact disc read-only memory (CD-ROM), a flash memory, or any combination of the above-described storage media, or other applicable storage media.

For example, the description of the memory in the embodiments of the electronic device may be referred to for illustration of the storage medium 500, and details will not be repeated here. The description above of the control method for the data driver or the control method for the timing controller may be referred to for specific functions and technical effects of the storage medium 500, and details will not be repeated here.

For the present disclosure, the following statements should be noted.

(1) The accompanying drawings related to the embodiment(s) of the present disclosure involve only the structure(s) in connection with the embodiment(s) of the present disclosure, and other structure(s) can be referred to common design(s).

(2) For the purpose of clarity, in accompanying drawings for illustrating the embodiment(s) of the present disclosure, the thickness and size of a layer or a structure may be enlarged or narrowed, that is, the drawings are not drawn in a real scale. It should be understood that, in the case that a component such as a layer, a film, a region, a substrate, or the like is referred to be "on" or "under" another component, the component may be "directly" "on" or "under" the another component, or an intermediate component may be disposed therebetween.

(3) In case of no conflict, the embodiments of the present disclosure and features in one embodiment or in different embodiments can be combined to obtain new embodiments.

What have been described above merely are specific implementations of the present disclosure, and the protection scope of the present disclosure is not limited thereto. Therefore, the protection scope of the present disclosure should be based on the protection scope of the claims.

The invention claimed is:

1. A control method for a data driver of a display panel, comprising:
   obtaining a data comparison signal, wherein the data comparison signal represents a comparison relationship between first display data for enabling a first pixel row to display and second display data for enabling a second pixel row to display, and in time, the second pixel row is driven to display after the first pixel row is driven to display; and
   controlling an operation state of the data driver according to the data comparison signal,
   wherein the data driver comprises a plurality of modules, and the plurality of modules are configured to receive an input data signal and obtain display data from the input data signal; and
   controlling the operation state of the data driver according to the data comparison signal, comprises:
      obtaining the second display data based on the first display data which has been cached by the data driver in response to the data comparison signal representing that the first display data and the second display data have a first comparison relationship, wherein the first comparison relationship comprises the first display data being identical or reverse to the second display data; or
      obtaining the second display data based on an input data signal which is received by the data driver and used for the second pixel row in response to the data comparison signal representing that the first display data and the second display data have a second comparison relationship different from the first comparison relationship,
   wherein controlling the operation state of the data driver according to the data comparison signal, further comprises:
      allowing at least one of the plurality of modules to be in a first operation state in response to the first comparison relationship; and
      allowing each of the plurality of modules to be in a second operation state in response to the second comparison relationship,
   wherein power consumption of each of the plurality of modules in the first operation state is less than power consumption of the each of the plurality of modules in the second operation state.

2. The control method for the data driver according to claim 1, wherein controlling the operation state of the data driver according to the data comparison signal, further comprises:
   determining whether the data driver receives the input data signal in response to the first comparison relationship.

3. The control method for the data driver according to claim 1, wherein obtaining the second display data based on the input data signal which is received by the data driver and used for the second pixel row, comprises:
   performing physical layer processing on an input electrical signal received by the data driver, and extracting the input data signal from the input electrical signal; and
   performing link layer processing on the input data signal to obtain the second display data based on the input data signal.

4. The control method for the data driver according to claim 1, wherein allowing at least one of the plurality of modules to be in the first operation state, comprises:
   allowing the at least one module to be in an inactive state.

5. The control method for the data driver according to claim 4, wherein the plurality of modules comprise a physical layer processing module, and the physical layer processing module comprises a data path sub-module and a clock path sub-module; and
   allowing the at least one module to be in the inactive state comprises: allowing the data path sub-module to be in an inactive state.

6. The control method for the data driver according to claim 4, wherein the plurality of modules comprise a physical layer processing module, and the physical layer processing module comprises a clock data recovery sub-module; and
   allowing the at least one module to be in the inactive state comprises: allowing a data recovery processing operation portion of the clock data recovery sub-module to be in an inactive state.

7. The control method for the data driver according to claim 4, wherein the plurality of modules comprise a link layer processing module, and the link layer processing module comprises a display data formatting sub-module; and
   allowing the at least one module to be in the inactive state comprises: allowing the display data formatting sub-module to be in an inactive state.

8. The control method for the data driver according to claim 4, wherein the plurality of modules comprise a physical layer processing module, and the physical layer processing module comprises an analog front-end sub-module; and
   allowing the at least one module to be in the inactive state comprises: allowing the analog front-end sub-module to be in an inactive state or to receive an electrical signal of a constant level.

9. The control method for the data driver according to claim 4, wherein the plurality of modules comprise a channel array processing module, the channel array processing module comprises a first latching sub-module and a second latching sub-module which are cascaded, and the first latching sub-module and the second latching sub-module are configured to cache the display data to be provided to the display panel; and allowing the at least one module to be in the inactive state comprises: allowing the first latching sub-module and/or the second latching sub-module to be in an inactive state.

10. The control method for the data driver according to claim 1, wherein obtaining the second display data based on the first display data which has been cached by the data driver, comprises:

outputting the first display data which has been cached by the data driver as the second display data in response to the first comparison relationship representing the first display data being identical to the second display data; or reversing, in the data driver, the first display data which has been cached by the data driver to obtain the second display data in response to the first comparison relationship representing the first display data being reverse to the second display data.

11. The control method for the data driver according to claim 1, wherein the first pixel row and the second pixel row are driven in an adjacent sequence in time for display, and the first pixel row and the second pixel row are two adjacent pixel rows arranged in the display panel.

12. A control method for a timing controller, comprising:

determining, according to source input data received from a data source, a comparison relationship between first display data for enabling a first pixel row to display and second display data for enabling a second pixel row to display, and generating a data comparison signal for representing the comparison relationship, wherein in time, the second pixel row is driven to display after the first pixel row is driven to display; and transmitting the data comparison signal to a data driver, wherein the control method for the timing controller further comprises: in response to the data comparison signal representing that the first display data and the second display data have a first comparison relationship, controlling an input data signal corresponding to the second display data to be disallowed to be transmitted to the data driver;

the first comparison relationship comprises the first display data being identical or reverse to the second display data; and controlling the input data signal corresponding to the second display data to be disallowed to be transmitted to the data driver, comprises: transmitting a virtual electrical signal to the data driver or stopping transmitting a valid electrical signal to the data driver during a time period of transmitting the input data signal corresponding to the second display data.

13. A timing controller, comprising:

a data comparison signal generating unit, configured to determine, according to source input data received from a data source, a comparison relationship between first display data for enabling a first pixel row to display and second display data for enabling a second pixel row to display and generate a data comparison signal for representing the comparison relationship, wherein in time, the second pixel row is driven to display after the first pixel row is driven to display; and a signal transmitting unit, configured to transmit the data comparison signal to a data driver, wherein the signal transmitting unit is further configured to, in response to the data comparison signal representing that the first display data and the second display data have a first comparison relationship, control an input data signal corresponding to the second display data to be disallowed to be transmitted to the data driver;

the first comparison relationship comprises the first display data being identical or reverse to the second display data; and controlling the input data signal corresponding to the second display data to be disallowed to be transmitted to the data driver, comprises: transmitting a virtual electrical signal to the data driver or stopping transmitting a valid electrical signal to the data driver during a time period of transmitting the input data signal corresponding to the second display data.

14. An electronic device, comprising the timing controller and the data driver according to claim 13, wherein the data driver comprises:

a data comparison signal acquiring unit, configured to obtain the data comparison signal; and an operation state controlling unit, configured to control an operation state of the data driver according to the data comparison signal.

15. The electronic device according to claim 14, further comprising a display panel, wherein the data driver is configured to provide display data to the display panel for driving pixel rows in the display panel to display.

16. An electronic device, comprising:

a memory, configured to store computer-executable instructions in a non-transitory manner; and a processor, configured to execute the computer-executable instructions, wherein the computer-executable instructions, upon execution by the processor, cause the processor to implement the control method for the data driver according to claim 1.

* * * * *